US012123589B1

(12) United States Patent
Tsur et al.

(10) Patent No.: US 12,123,589 B1
(45) Date of Patent: Oct. 22, 2024

(54) FLOOD PROJECTOR WITH MICROLENS ARRAY

(71) Applicant: APPLE INC., Cupertino, CA (US)

(72) Inventors: Yuval Tsur, Tel Aviv (IL); Refael Della Pergola, Jerusalem (IL); Roei Remez, Tel Aviv (IL); Assaf Avraham, Givatayim (IL); Yazan Alnahhas, Mountain View, CA (US)

(73) Assignee: APPLE INC., Cupertino, CA (US)

(*) Notice: Subject to any disclaimer, the term of this patent is extended or adjusted under 35 U.S.C. 154(b) by 0 days.

(21) Appl. No.: 18/321,025

(22) Filed: May 22, 2023

(51) Int. Cl.
*F21V 5/00* (2018.01)
*F21V 3/04* (2018.01)

(52) U.S. Cl.
CPC ................ *F21V 5/007* (2013.01); *F21V 3/04* (2013.01); *F21V 5/004* (2013.01)

(58) Field of Classification Search
CPC . F21V 5/004; F21V 5/007; F21V 3/04; G02B 5/1809; G02B 5/1871
See application file for complete search history.

(56) References Cited

U.S. PATENT DOCUMENTS

| | | | |
|---|---|---|---|
| 4,069,463 | A | 1/1978 | McGroddy et al. |
| 4,935,939 | A | 6/1990 | Liau et al. |
| 5,812,571 | A | 9/1998 | Peters |
| 6,055,262 | A | 4/2000 | Cox et al. |
| 6,156,980 | A | 12/2000 | Peugh et al. |
| 6,597,713 | B2 | 7/2003 | Ouchi |
| 6,625,028 | B1 | 9/2003 | Dove et al. |
| 6,674,948 | B2 | 1/2004 | Yeh et al. |
| 6,936,855 | B1 | 8/2005 | Harrah |
| 7,126,218 | B1 | 10/2006 | Darveaux et al. |
| 7,271,461 | B2 | 9/2007 | Dutta |
| 7,303,005 | B2 | 12/2007 | Reis et al. |
| 7,800,067 | B1 | 9/2010 | Rajavel et al. |
| 7,949,024 | B2 | 5/2011 | Joseph |
| 8,050,461 | B2 | 11/2011 | Shpunt et al. |

(Continued)

FOREIGN PATENT DOCUMENTS

| | | |
|---|---|---|
| CN | 205123806 U | 3/2016 |
| CN | 107219711 A | 9/2017 |

(Continued)

OTHER PUBLICATIONS

CN Application # 2021105284688 Office Action dated Sep. 29, 2023.

(Continued)

*Primary Examiner* — Tracie Y Green
*Assistant Examiner* — Michael Chiang
(74) *Attorney, Agent, or Firm* — MEITAR PATENTS LTD.

(57) ABSTRACT

An optoelectronic apparatus includes a semiconductor substrate and an array of emitters disposed on the semiconductor substrate and configured to emit beams of optical radiation having respective chief rays. An optical diffuser is mounted over the semiconductor substrate and configured to diffuse the beams. Microlenses are disposed between the semiconductor substrate and the optical diffuser in respective alignment with the emitters and configured to steer the beams at different, respective angles, which are selected so that at least some of the chief rays cross one another before passing through the diffuser.

18 Claims, 9 Drawing Sheets

(56) References Cited

U.S. PATENT DOCUMENTS

| | | | |
|---|---|---|---|
| 8,193,482 | B2 | 6/2012 | Itsler |
| 8,259,293 | B2 | 9/2012 | Andreou |
| 8,275,270 | B2 | 9/2012 | Shushakov et al. |
| 8,350,847 | B2 | 1/2013 | Shpunt |
| 8,355,117 | B2 | 1/2013 | Niclass |
| 8,405,020 | B2 | 3/2013 | Menge |
| 8,604,603 | B2 | 12/2013 | Lau et al. |
| 8,761,495 | B2 | 6/2014 | Freedman et al. |
| 8,766,164 | B2 | 7/2014 | Sanfilippo et al. |
| 8,963,069 | B2 | 2/2015 | Drader et al. |
| 9,024,246 | B2 | 5/2015 | Jiang et al. |
| 9,052,356 | B2 | 6/2015 | Chu et al. |
| 9,076,707 | B2 | 7/2015 | Harmon |
| 9,106,849 | B2 | 8/2015 | Duggal et al. |
| 9,430,006 | B1 | 8/2016 | Hayashida |
| 9,735,539 | B2 | 8/2017 | Jiang et al. |
| 9,819,144 | B2 | 11/2017 | Lin et al. |
| 9,826,131 | B2 | 11/2017 | Alasirnio et al. |
| 10,034,375 | B2 | 7/2018 | Pyper et al. |
| 10,103,512 | B2 | 10/2018 | Jiang et al. |
| 10,305,247 | B2 | 5/2019 | Bills et al. |
| 10,375,330 | B2 | 8/2019 | Rephaeli et al. |
| 10,401,480 | B1 | 9/2019 | Gaalema et al. |
| 10,454,241 | B2 | 10/2019 | Jiang et al. |
| 10,470,307 | B2 | 11/2019 | Pyper et al. |
| 10,551,886 | B1 | 2/2020 | de la Fuente |
| 10,881,028 | B1 | 12/2020 | Huang et al. |
| 11,296,136 | B2 | 4/2022 | Nagai et al. |
| 11,699,715 | B1 | 7/2023 | Alnahhas |
| 11,710,945 | B2 | 7/2023 | Alnahhas et al. |
| 2002/0070443 | A1 | 6/2002 | Mu et al. |
| 2002/0127752 | A1 | 9/2002 | Thompson et al. |
| 2002/0176459 | A1 | 11/2002 | Martinsen |
| 2003/0081385 | A1 | 5/2003 | Mochizuki et al. |
| 2004/0001317 | A1 | 1/2004 | Getz, Jr. et al. |
| 2004/0180470 | A1 | 9/2004 | Romano et al. |
| 2007/0233208 | A1 | 10/2007 | Kurtz et al. |
| 2007/0262441 | A1 | 11/2007 | Chen |
| 2008/0240196 | A1 | 10/2008 | Nishida |
| 2010/0164079 | A1 | 7/2010 | Dekker et al. |
| 2010/0208132 | A1 | 8/2010 | Shiraishi |
| 2011/0026264 | A1 | 2/2011 | Reed et al. |
| 2011/0278629 | A1 | 11/2011 | McDaniel et al. |
| 2012/0002293 | A1 | 1/2012 | Du et al. |
| 2012/0051384 | A1 | 3/2012 | Geske et al. |
| 2013/0015331 | A1 | 1/2013 | Birk et al. |
| 2013/0163627 | A1 | 6/2013 | Seurin |
| 2013/0342835 | A1 | 12/2013 | Blaksberg |
| 2014/0231630 | A1 | 8/2014 | Rae et al. |
| 2014/0348192 | A1 | 11/2014 | Prujimboom et al. |
| 2014/0353471 | A1 | 12/2014 | Raynor et al. |
| 2015/0092802 | A1 | 4/2015 | Gronenborn et al. |
| 2015/0163429 | A1 | 6/2015 | Dai et al. |
| 2015/0195956 | A1 | 7/2015 | Linderman |
| 2015/0200222 | A1 | 7/2015 | Webster |
| 2015/0200314 | A1 | 7/2015 | Webster |
| 2015/0255955 | A1 | 9/2015 | Wang et al. |
| 2015/0340841 | A1 | 11/2015 | Joseph |
| 2015/0342023 | A1 | 11/2015 | Refai-Ahmed et al. |
| 2015/0348865 | A1 | 12/2015 | Vincent et al. |
| 2016/0300825 | A1 | 10/2016 | Hoeppel |
| 2017/0170219 | A1 | 6/2017 | Iwafuchi et al. |
| 2017/0353012 | A1 | 12/2017 | Barve et al. |
| 2018/0092241 | A1 | 3/2018 | Rasmussen et al. |
| 2018/0092253 | A1 | 3/2018 | Qiu et al. |
| 2018/0239105 | A1 | 8/2018 | Lee et al. |
| 2018/0310407 | A1 | 10/2018 | Pyper et al. |
| 2019/0129035 | A1 | 5/2019 | Valouch et al. |
| 2019/0264890 | A1 | 8/2019 | Chang et al. |
| 2019/0268068 | A1 | 8/2019 | Dacha et al. |
| 2019/0295264 | A1 | 9/2019 | Petilli |
| 2019/0324223 | A1 | 10/2019 | Yim et al. |
| 2019/0326731 | A1 | 10/2019 | Mathai et al. |
| 2019/0348819 | A1 | 11/2019 | Laflaquiere et al. |
| 2019/0381939 | A1 | 12/2019 | Rafalowski et al. |
| 2020/0096639 | A1 | 3/2020 | Panas et al. |
| 2020/0105827 | A1* | 4/2020 | Subramanya ............. F21K 9/23 |
| 2020/0284883 | A1 | 9/2020 | Ferreira et al. |
| 2020/0388640 | A1 | 12/2020 | Yu et al. |
| 2021/0083454 | A1 | 3/2021 | Nakata et al. |
| 2021/0313764 | A1 | 10/2021 | Alnahhas et al. |
| 2021/0336424 | A1* | 10/2021 | Hegblom ............ H01S 5/18388 |
| 2022/0187631 | A1 | 6/2022 | Jang et al. |
| 2022/0205611 | A1* | 6/2022 | Yousefi ............... F21V 33/0052 |
| 2023/0220974 | A1* | 7/2023 | Eilertsen ............ G01B 11/2536 362/235 |
| 2024/0094553 | A1* | 3/2024 | Remez ................ H01S 5/18386 |

FOREIGN PATENT DOCUMENTS

| | | | |
|---|---|---|---|
| CN | 108332082 | A | 7/2018 |
| CN | 208654319 | U | 3/2019 |
| CN | 110867724 | A | 3/2020 |
| CN | 210224593 | U | 3/2020 |
| CN | 106444209 | B | 5/2020 |
| CN | 110380211 | B | 5/2021 |
| CN | 113359112 | A | 9/2021 |
| CN | 110398850 | B | 4/2023 |
| EP | 0949728 | A1 | 10/1999 |
| WO | 2014087301 | A1 | 6/2014 |
| WO | 2018093730 | A1 | 5/2018 |
| WO | 2018132521 | A1 | 7/2018 |
| WO | 2019149778 | A1 | 8/2019 |
| WO | 2020026616 | A1 | 2/2020 |
| WO | 2020039086 | A1 | 2/2020 |
| WO | 2020074351 | A1 | 4/2020 |

OTHER PUBLICATIONS

Burrows, “Metalens grows up—Researchers develop a mass-producible, centimeter-scale Metalens for VR, Imaging,” Harvard School of Engineering and Applied Sciences, pp. 1-4, Dec. 3, 2019.
Thorlabs, Inc., “Introduction to Diffraction Grating, ” Optics Selection Guide in Product Catalog, pp. 798-808, years 1999-2023, as downloaded from https://www.thorlabs.com/catalogpages/805.pdf.
Nielsen et al., “Meta Optical Elements—The Technology of Flat Metalenses,” Tech Briefs, SAE Media Group, pp. 1-8, Sep. 1, 2022, as downloaded from https://www.techbriefs.com/component/content/article/tb/supplements/pit/features/technology-leaders/46527.
Boulder Nonlinear Systems, “High-Definition Time-of-Flight Imaging,” Product Information, pp. 1-10, year 2022, as downloaded from https://web.archive.org/web/20220124203941/https://www.bnonlinear.com/case-studies/high-definition-time-flight-imaging.
Remez et al., U.S. Appl. No. 18/307,820, filed Apr. 27, 2023.
Della Pergola et al., U.S. Appl. No. 18/321,021, filed May 22, 2023.
U.S. Appl. No. 17/221,856 Office Action dated Mar. 20, 2024.
U.S. Appl. No. 17/221,856 Office Action dated Jun. 24, 2024.

* cited by examiner

CONTROLLER

FLOOD PROJECTOR WITH MICROLENS ARRAY

FIELD OF THE INVENTION

The present invention relates generally to optoelectronic devices, and particularly to sources of optical radiation.

BACKGROUND

Various sorts of portable computing devices (referred to collectively as "portable devices" in the description), such as smartphones, augmented reality (AR) devices, virtual reality (VR) devices, smart watches, and smart glasses, comprise compact sources of optical radiation. For example, one source may project patterned radiation to illuminate a target region with a pattern of spots for three-dimensional (3D) mapping of the region. Another source may, for example, emit flood radiation, illuminating a target region uniformly over a wide field of view for the purpose of capturing a color or a monochromatic image.

The terms "optical rays," "optical radiation," and "light," as used in the present description and in the claims, refer generally to electromagnetic radiation in any or all of the visible, infrared, and ultraviolet spectral ranges.

Optical metasurfaces are thin layers that comprise a two-dimensional pattern of structures, having dimensions (pitch and thickness) less than the target wavelength of the radiation with which the optical metasurface is designed to interact. Optical elements comprising optical metasurfaces are referred to herein as "metasurface optical elements" (MOEs).

SUMMARY

Embodiments of the present invention that are described hereinbelow provide improved designs and methods for use and fabrication of sources of optical radiation.

There is therefore provided, in accordance with an embodiment of the invention, an optoelectronic apparatus, including a semiconductor substrate and an array of emitters disposed on the semiconductor substrate and configured to emit beams of optical radiation having respective chief rays. An optical diffuser is mounted over the semiconductor substrate and configured to diffuse the beams. Microlenses are disposed between the semiconductor substrate and the optical diffuser in respective alignment with the emitters and configured to steer the beams at different, respective angles, which are selected so that at least some of the chief rays cross one another before passing through the diffuser.

In some embodiments, the diffuser includes an optical substrate and an optical metasurface disposed on the optical substrate. In a disclosed embodiment, the optical metasurface is configured to split the beams into respective groups of diverging sub-beams, and to direct the sub-beams to illuminate a target with flood illumination.

Additionally or alternatively, the apparatus includes a semiconductor die mounted on the semiconductor substrate, wherein the emitters are disposed on a back side of the semiconductor die and the microlenses are formed on a front side of the semiconductor die. In a disclosed embodiment, the microlenses include a monolithic part of the semiconductor die.

In a disclosed embodiment, the microlenses are laterally offset relative to the emitters with an offset that varies among the microlenses so as to steer the beams at the different, respective angles. Additionally or alternatively, the microlenses have different, respective sag angles, which are selected so as to steer the beams at the different, respective angles.

In one embodiment, each microlens includes a tilted toroidal surface having a tilt selected so as to steer the beams at the different, respective angles.

In another embodiment, the microlenses are configured to randomize the angles at which the beams are steered. Additionally or alternatively, the microlenses are configured to increase a divergence of the beams emitted by the emitters.

In a disclosed embodiment, the apparatus includes a controller, which is configured to actuate the apparatus so as to illuminate a target with flood illumination.

There is also provided, in accordance with an embodiment of the invention, a method for optical projection, which includes mounting on a semiconductor substrate an array of emitters configured to emit beams of optical radiation having respective chief rays. An optical diffuser is mounted over the semiconductor substrate so as to diffuse the beams. Microlenses are aligned between the semiconductor substrate and the optical diffuser with the emitters so as to steer the beams at different, respective angles, which are selected so that at least some of the chief rays cross one another before passing through the diffuser.

The present invention will be more fully understood from the following detailed description of the embodiments thereof, taken together with the drawings in which:

DETAILED DESCRIPTION OF EMBODIMENTS

Overview

Figures 1A, 1B:
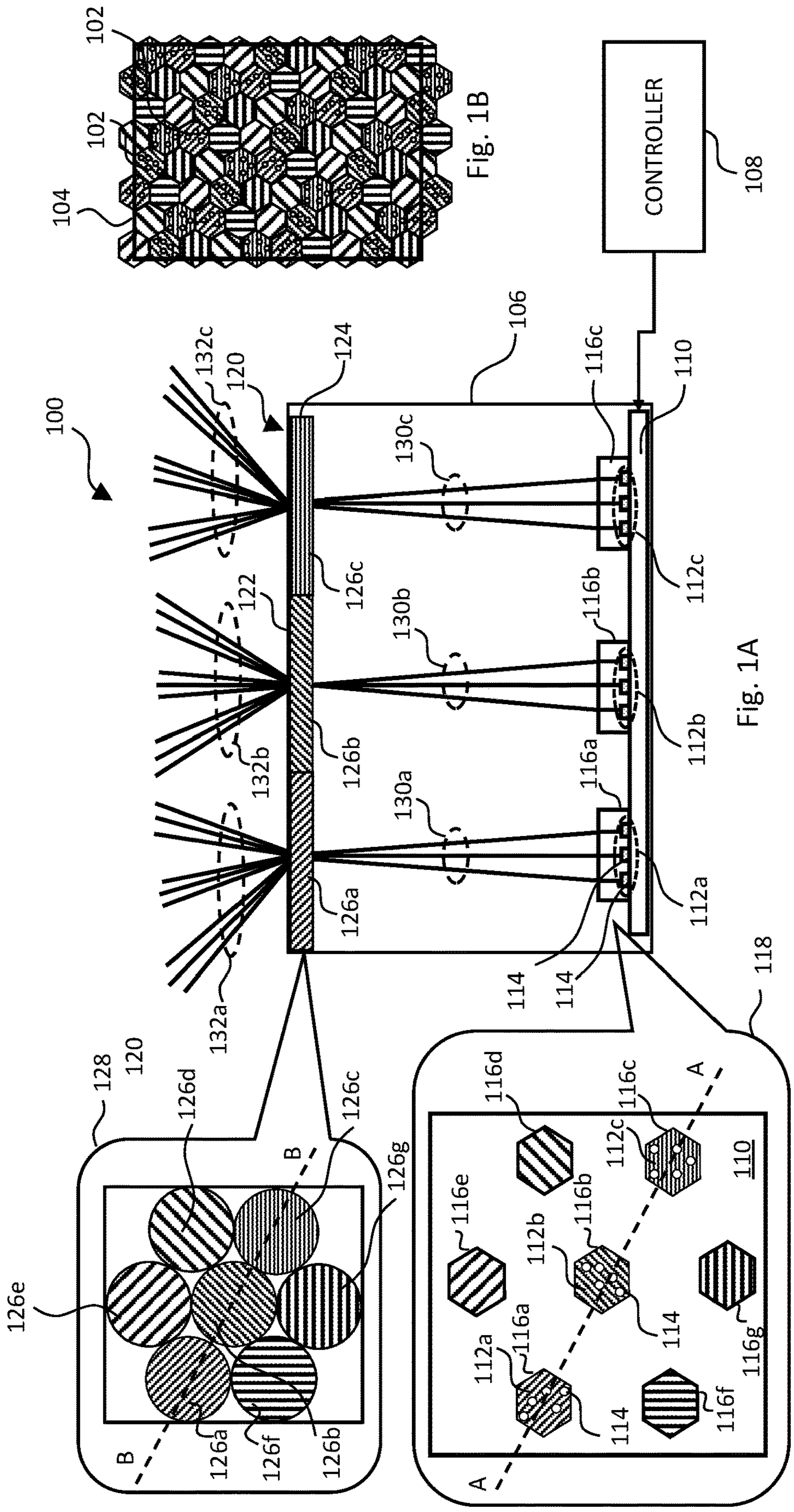
FIG. 1A is a schematic side view of an optoelectronic apparatus, in accordance with an embodiment of the invention.
FIG. 1B is a schematic frontal view of a far-field pattern of spots on a target projected by the apparatus of FIG. 1A, in accordance with an embodiment of the invention.

Compact structured light projectors that are used to project patterns of spots in portable devices may use a single-element MOE, which splits each of the beams emitted by an array of light sources into multiple sub-beams and projects the beams to form a pattern of spots on a target. To detect the radiation returned from the spots in the pattern with a sufficient signal-to-noise ratio from even a distant target, the emitters in the array emit beams with high optical power. However, high-power beams that are concentrated on a small area of the MOE or any subsequent layers above it, i.e., impinging on the MOE with a high irradiance, may damage the MOE or any of these layers, as well as any other adjacent elements transmitting these beams. There is thus a need to reduce the irradiance on the MOE in a structured light projector while still maintaining high overall signal-to-noise ratio.

Embodiments of the present invention that are described herein address this need by using an MOE, which comprises multiple optical apertures, and multiple emitter arrays. Each emitter array emits optical beams to a respective optical aperture of the MOE, thus spreading out the optical power over a large surface area.

The disclosed embodiments provide optoelectronic apparatus comprising a semiconductor substrate, multiple arrays of emitters disposed on the semiconductor substrate and emitting beams of optical radiation, an optical substrate mounted over the semiconductor substrate, and an MOE comprising multiple optical apertures disposed on the optical substrate. Each optical aperture receives, collimates and splits the beams emitted by a respective array of emitters into a respective group of collimated sub-beams. The MOE directs the collimated sub-beams toward a target at different, respective angles to form a pattern of spots on the target. The power of the emitted optical beams is spread over multiple optical apertures on the MOE, thus reducing the irradiance on the MOE and preventing damage to it and any subsequent layers above the MOE.

In some embodiments, that apparatus also comprises multiple microlenses. Each microlens array is aligned with a respective array of emitters and projects the beams emitted by the array toward the respective optical apertures of the MOE. The employment of microlenses relieves constraints on the design of the apparatus by decoupling the design of the emitter arrays on the semiconductor surface from the design of the MOE, allowing for the design of emitter arrays with smaller size and reduced cost.

In additional embodiments, similar arrangements are used to project flood illumination onto a target.

For the sake of concreteness and clarity, the embodiments described hereinbelow present optical projectors having certain specific configurations, including particular numbers of emitters, dies, and MOEs in certain geometries and with certain dimensions. These configurations are shown and described solely by way of examples. Alternative configurations, based on the principles described herein, will be apparent to those skilled in the art after reading the present description and are considered to be within the scope of the present invention.

Spot Projectors

FIG. 1A is a schematic side view of an optoelectronic apparatus 100, and FIG. 1B is a schematic frontal view of a far-field pattern of spots 102 on a target 104 projected by the apparatus, in accordance with an embodiment of the invention.

Apparatus 100 comprises a spot projector 106 and a controller 108. Projector 106 comprises a semiconductor substrate 110, on which hexagonal III-V semiconductor dies 116*a*, 116*b*, 116*c*, 116*d*, 116*e*, 116*f*, and 116*g* are mounted. Dies 116*a*-116*c* comprise respective arrays 112*a*, 112*b*, and 112*c* of emitters of optical radiation, for example VCSELs (Vertical-Cavity Surface-Emitting Lasers) 114. In the present embodiment, semiconductor substrate 110 comprises a silicon (Si) substrate, and III-V semiconductor dies 116*a*-116*g* comprise GaAs (gallium arsenide). GaAs dies 116*a*-116*g* are mounted on Si substrate 110 in a VCSEL-on-silicon (VoS) configuration, wherein the Si substrate comprises the drive and control circuits for the VCSELs. A similar VoS configuration can be utilized in the additional apparatuses described hereinbelow. VCSELs 114 are formed on the back sides of GaAs dies 116*a*-116*g* and emit beams of optical radiation through the respective dies. In alternative embodiments, other semiconductor materials, as well as other kinds of emitters and emitter configurations, may be used. Microlenses may be formed on the top surfaces of GaAs dies 116*a*-116*g*, as shown in the figures that follow, so as to refract and direct the beams emitted by VCSELs 114, for example as illustrated in FIG. 1A.

GaAs dies 116*a*-116*g* are shown in a schematic frontal view in an inset 118, with a line A-A corresponding to the plane of FIG. 1A. VCSELs 114 are arranged in non-repeating patterns in arrays 112*a*-112*c* in order to enable differentiating far distances from near distances when apparatus 100 is used for 3D mapping of target 104. (The VCSELs on dies 116*d*-116*g* are omitted from the figure for the sake of simplicity.) In the current embodiment, the width of each GaAs die 116*a*-116*g* is 260 μm, the thickness is 110 μm, and the separations between adjacent dies are 1 mm. Alternative embodiments may have other dimensions for the dies and their separations.

Projector 106 further comprises an MOE 120, comprising an optical metasurface 122 disposed on an optical substrate 124. Optical metasurface 122 comprises optical apertures 126*a*-126*g*, which are aligned with respective GaAs dies 116*a*-116*g* and contain respective parts of the MOE pattern for diffracting the beams emitted by the VCSELs on the respective dies. (The term "optical aperture" of an MOE will hereinbelow be used to refer to the portion of the MOE defined by the optical aperture. Thus, the optical aperture will have the optical properties of the MOE within the aperture, such as focusing, splitting, and tilting optical beams.) The diameters of optical apertures 126*a*-126*g* are 1 mm, thus providing sufficient surface area for the impinging beams of optical radiation from VCSELs 114 to avoid high and potentially damaging irradiance on MOE 120. MOE 120 and optical apertures 126*a*-126*g* are shown in a schematic frontal view in an inset 128, with a line B-B corresponding to the plane of FIG. 1A. The spacing between Si substrate 110 and MOE 120 is typically 3 mm, although other spacings may alternatively be used.

Controller 108 is coupled to the drive and control circuits in Si substrate 110. Controller 108 typically comprises a programmable processor, which is programmed in software and/or firmware to drive VCSELs 114. Alternatively or additionally, controller 108 comprises hard-wired and/or programmable hardware logic circuits, which drive VCSELs 114. Although controller 108 is shown in the figures, for the sake of simplicity, as a single, monolithic functional block, in practice the controller may comprise a single chip or a set of two or more chips, with suitable interfaces for outputting the drive signals that are illustrated in the figures and are described in the text. The controllers shown and described in the context of the embodiments that follow are of similar construction.

For projecting a pattern of spots 102 on target 104 (as shown in FIG. 1B), controller 108 drives VCSELs 114 in arrays 112*a*-112*c* to emit beams of optical radiation, represented schematically by respective chief rays 130*a*, 130*b*, and 130*c*. The beams are refracted by microlenses as described hereinabove and impinge on respective optical apertures 126*a*-126*c*, which split, tilt, and collimate the beams into sub-beams 132*a*, 132*b*, and 132*c* and direct them toward target 104, so that projected images of GaAs dies 116*a*-116*g* are tiled on the target as replicas in an interleaved fashion, as shown schematically in FIG. 1B. A compact and efficient tiling is enabled by the hexagonal shapes of dies 116*a*-116*g*. In alternative embodiments, other shapes may be used for the dies and VCSEL arrays, leading to tiling with varying degrees of compactness and efficiency.

Combined Spot and Flood Projector

Figures 2A, 2B, 2C:
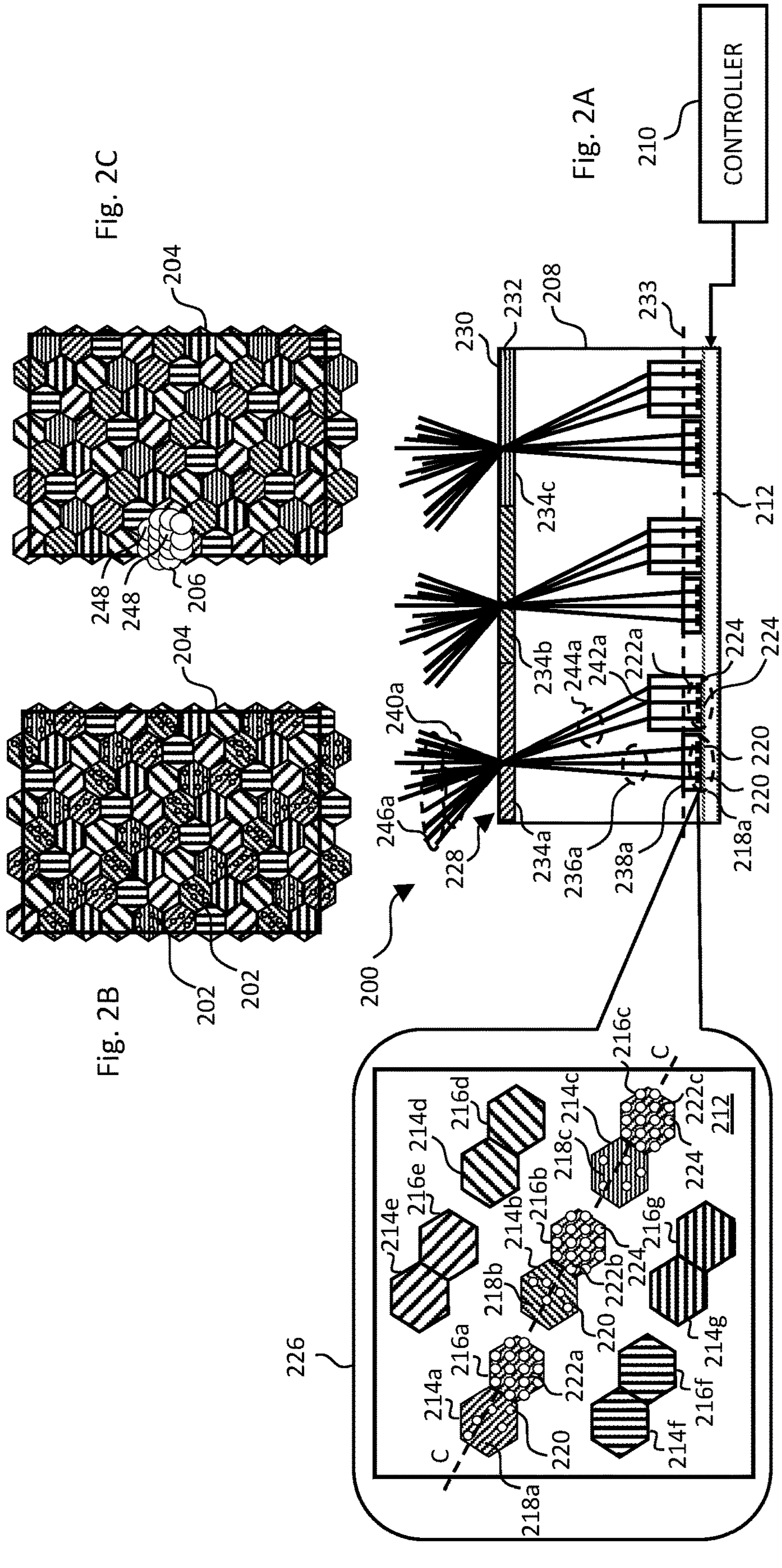
FIG. 2A is a schematic side view of an optoelectronic apparatus, in accordance with an alternative embodiment of the invention.
FIG. 2B is a schematic frontal view of a far-field pattern of spots on a target projected by the apparatus of FIG. 2A, in accordance with an embodiment of the invention.
FIG. 2C is a schematic frontal view of flood illumination on a target projected by the apparatus of FIG. 2A, in accordance with an embodiment of the invention.

FIG. 2A is a schematic side view of an optoelectronic apparatus 200, FIG. 2B is a schematic frontal view of a far-field pattern of spots 202 on a target 204 projected by the apparatus, and FIG. 2C is a schematic frontal view of flood illumination 206 on the target projected by the apparatus, in accordance with an embodiment of the invention.

Apparatus 200 comprises a combined spot and flood projector 208 and a controller 210. Projector 208 comprises a Si substrate 212, on which two sets of hexagonal GaAs dies are mounted. A first set comprises seven dies 214*a*, 214*b*, 214*c*, 214*d*, 214*e*, 214*f*, and 214*g*. A second set comprises similarly seven dies 216*a*, 216*b*, 216*c*, 216*d*, 216*e*, 216*f*, and 216*g*, each adjacent to a respective die 214*a*-214*g*. The two sets of dies 214*a*-214*g* and 216*a*-216*g* differ from each other both in terms of the die thicknesses and the arrangement of the VCSEL arrays formed in the respective dies, as will be detailed hereinbelow.

Dies 214*a*-214*c* comprise respective VCSEL arrays 218*a*, 218*b*, and 218*c*, similar to arrays 112*a*-112*c*, comprising VCSELs 220. (Similarly to FIG. 1A, VCSELs 220 are not shown in dies 214*d*-214*g* for the sake of simplicity.) Dies 216, 216*b*, and 216*c* comprise respective dense VCSEL arrays 222*a*, 222*b*, and 222*c*, comprising VCSELs 224, while the arrays in dies 216*d*-216*g* are not shown for the sake of simplicity. Arrays 222 are "dense" in the sense that dies 216 are tightly filled with active VCSELs 224, in contrast to arrays 218 on dies 214, in which many of the cells do not contain active VCSELs 220, so that arrays 218 generate patterns of light spots corresponding to the layout of the active VCSELs in arrays 218.

Si substrate 212, GaAs dies 214*a*-214*g*, and GaAs dies 216*a*-216*g* are shown in a schematic frontal view in an inset 226, with a line C-C in the inset corresponding to the plane of FIG. 2A.

Projector 208 further comprises an MOE 228, similar to MOE 120 (FIG. 1A), comprising an optical metasurface 230 disposed on an optical substrate 232, and having a focal plane 233. Optical metasurface 230 comprises optical apertures 234*a*, 234*b*, 234*c*, 234*d*, 234*e*, 234*f*, and 234*g*, which are aligned with respective GaAs dies 214*a*-214*g*, and are laid out in a similar configuration to optical apertures 126*a*-126*g* shown in inset 128. The diameters of optical apertures 234*a*-234*g* in this example are 1 mm, thus providing sufficient surface area for avoiding high and potentially damaging irradiance on MOE 228 or subsequent layers above the MOE by beams of optical radiation emitted by VCSELs 220 and 224.

GaAs dies 214*a*-214*g* in the present embodiment are thinned, with a thickness of 90 μm, for example, and the top surfaces of these dies are located at focal plane 233 of MOE 228. (Microlenses may be formed on the upper side of the dies, as described hereinabove, so that the beams emitted by VCSELs 220 are directed toward respective apertures 234*a*-234*g* of MOE 228 and also that the apparent source of the beams is located at or close to the top surface of each die. Microlenses are shown explicitly in some of the figures that follow.) Thus the beams of optical radiation emitted by VCSELs 220, as represented by chief rays 236*a* emitted by the VCSELs in VCSEL array 218*a* from a top surface 238*a*, are tilted, split, and collimated by aperture 234*a* of MOE 228 into sub-beams 240*a* and form discrete spots 202 on target 204.

GaAs dies 216*a*-216*g*, however, have a greater thickness, for example 250 μm, displacing their respective top surfaces from focal plane 233. Thus, for example, the beams emitted by VCSELs 224 of array 222*a* from a top surface 242*a*, represented by chief rays 244*a*, are split, tilted and defocused by aperture 234*a* of MOE 228 into diverging sub-beams 246*a*, and spots 248 formed on target 204 are blurred. This blur, combined with the dense VCSELs 224 in VCSEL array 222*a*, leads to the target being illuminated by uniform flood illumination 206. In alternative embodiments, other thicknesses for the GaAs dies may be used, as long as their height differences are sufficient to blur the spots illuminated by VCSELs 224.

Alternative Spot Projectors

Figures 3A, 3B:
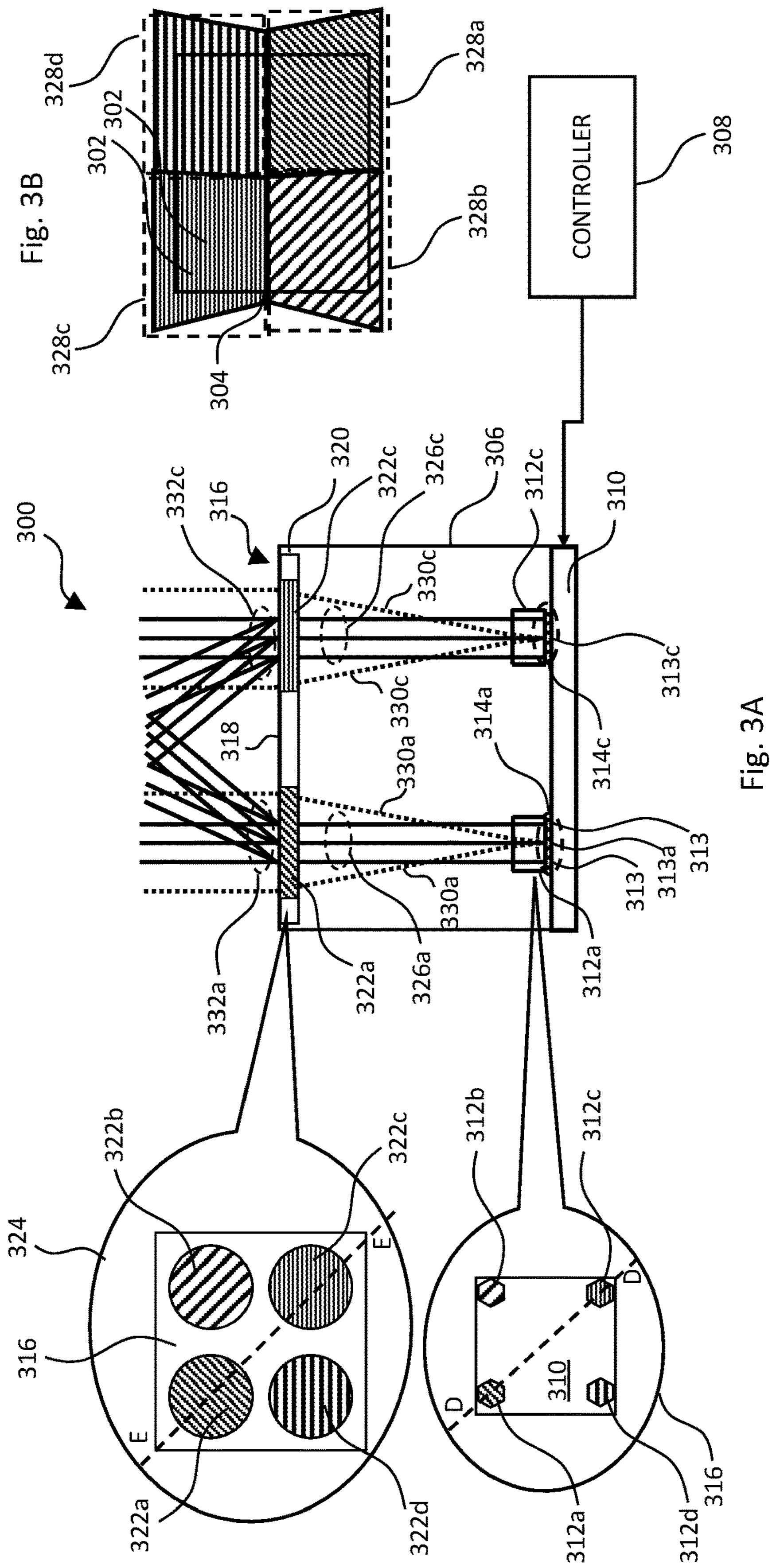
FIG. 3A is a schematic side view of an optoelectronic apparatus, in accordance with another embodiment of the invention.
FIG. 3B is a schematic frontal view of a far-field pattern of spots on a target projected by the apparatus of FIG. 3A, in accordance with an embodiment of the invention.

FIG. 3A is a schematic side view of an optoelectronic apparatus 300, and FIG. 3B is a schematic frontal view of a far-field pattern of spots 302 on a target 304 projected by the apparatus, in accordance with an embodiment of the invention.

Apparatus 300 comprises a spot projector 306 and a controller 308, similar to controller 108 (FIG. 1A). Projector 306 comprises a Si substrate 310 comprising drive and control circuits. Four GaAs dies 312*a*, 312*b*, 312*c*, and 312*d* are mounted on the Si substrate in a VoS configuration, with the GaAs dies comprising VCSELs 313 in respective VCSEL arrays 314*a*, 314*b*, 314*c*, and 314*d*. Si substrate 310 and GaAs dies 312*a*-312*d* are shown in a schematic frontal view in an inset 316. A line D-D in the frontal view corresponds to the plane of FIG. 3A. (For the sake of simplicity, VCSEL arrays 314*a*-314*d* are not shown in the frontal view.) The widths of GaAs dies 312*a*-312*d* are 380 μm in the present example, and their center-to-center spacings in the two orthogonal directions are 1.96 mm. In alternative embodiments, other dimensions and spacings for the GaAs dies may be used.

Projector 306 further comprises an MOE 316, comprising an optical metasurface 318 disposed on an optical substrate 320. Optical metasurface 318 comprises optical apertures 322*a*, 322*b*, 322*c*, and 322*d*, which are aligned with respective GaAs dies 312*a*-312*d*. MOE 316 is shown in a schematic frontal view in an inset 324, with a line E-E corresponding to the plane of FIG. 3A. The diameters of optical apertures 322*a*-322*d* are 1.66 mm, thus providing sufficient surface area for the impinging beams of optical radiation from VCSELs 313 to avoid high and potentially damaging irradiance on MOE 316 or subsequent layers above the MOE.

When driven by controller 308, VCSELs 313 of VCSEL arrays 314*a*-314*d* emit beams of optical radiation. The beams emitted by arrays 314*a* and 314*c* are shown schematically by their respective chief rays 326*a* and 326*c*. The beams represented by chief rays 326*a* and 326*c* impinge on respective optical apertures 322*a* and 322*c*, which collimate, tilt, and split the beams into respective sub-beams 332*a* and 332*c* and direct them toward target 304, illuminating the target by respective spot patterns 328*a* and 328*c*. The collimation of the optical beams is shown by marginal rays 330*a* and 330*c* emitted by respective VCSELs 313*a* and 313*c*. Beams emitted by VCSEL arrays 314*b* and 314*d* form respective spot patterns 328*b* and 328*d* on target 304.

FIG. 3B schematically shows spot patterns 328*a*-328*d* arranged on target 304, with their respective edges touching but with minimal overlap. (Because of the small scale of the figure, only the areas of the spot patterns are shown and not the individual spots.) Depending on the distance of target 304 from projector 306, spot patterns 328*a*-328*d* may either be completely separated or overlapping at their edges. Spot patterns 328*a*-328*d* formed by the beams from respective, different emitter arrays thus illuminate substantially separate areas of target 304. This illumination scheme, termed "zonal illumination," differs from the scheme shown in FIG. 1B, wherein the spot patterns from different emitter arrays are tiled in an interleaved fashion.

Figures 4A, 4B:
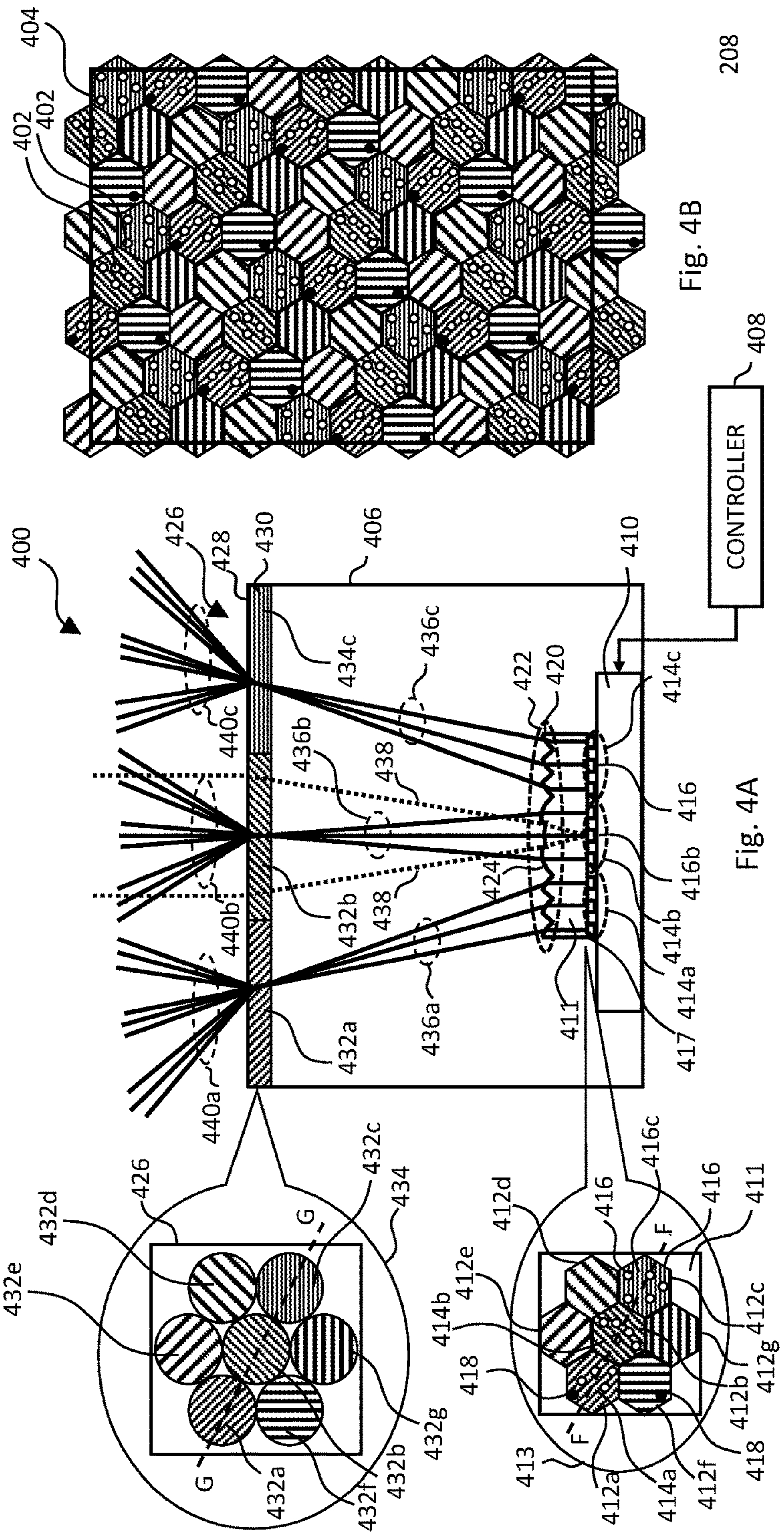
FIG. 4A is a schematic side view of an optoelectronic apparatus, in accordance with yet another embodiment of the invention.
FIG. 4B is a schematic frontal view of a far-field pattern of spots on a target projected by the apparatus of FIG. 4A, in accordance with an embodiment of the invention.

FIG. 4A is a schematic side view of an optoelectronic apparatus 400, and FIG. 4B is a schematic frontal view of a far-field pattern of spots 402 on a target 404 projected by the apparatus, in accordance with an embodiment of the invention.

Apparatus 400 comprises a spot projector 406 and a controller 408, similar to controller 108 (FIG. 1A). Projector 406 comprises a Si substrate 410, comprising drive and control circuits, and a single GaAs die 411 mounted on the Si substrate in a VoS configuration. GaAs die 411 comprises seven hexagonal sections 412*a*, 412*b*, 412*c*, 412*d*, 412*e*, 412*f*, and 412*g*, shown in a schematic frontal view in an inset 413, with a line F-F in the inset corresponding to the plane of FIG. 4A. Sections 412*a*, 412*b*, and 412*c* comprise respective emitter arrays 414*a*, 414*b*, and 414*c*, comprising VCSELs 416 (marked by open circles). VCSELs 416 are disposed on a back side 417 of GaAs die 411, facing Si substrate 410. Sections 412*a* and 412*f* additionally comprise VCSELs 418, termed "probing emitters" and marked with filled circles. VCSELs 418 are either lit or not lit and can be used for security purposes. VCSELs 416, used for 3D mapping of target 404, are arranged in non-repeating patterns in order to enable differentiating far distances from near distances, similarly to emitters 114 of apparatus 100 (FIG. 1A). VCSELs 416 in sections 412*d*-412*g* are not shown for the sake of simplicity.

As described hereinabove, VCSEL arrays 414*a*-414*c* are all disposed on a single, small GaAs die 411, rather than in multiple dies, such as VCSEL arrays 112 of apparatus 100. Other embodiments may similarly be produced using either a single GaAs die or multiple dies. Using a single GaAs die typically requires a more pronounced steering of beams than using multiple dies, as is seen by comparing the beam paths in FIG. 4 to those in FIG. 1A, for example.

A microlens array 422 is etched on a top side 420 of GaAs die 411 after the die has been thinned. Microlens array 422 comprises microlenses 424, wherein each microlens comprises a tilted toroidal surface and is aligned with a respective VCSEL array. Microlenses 424 are designed to refract the beams of optical radiation emitted by VCSELs 416 so as to satisfy the beam-steering requirements of a single-die implementation, as will be detailed hereinbelow. Typical sags of the microlenses (heights of the microlens profiles) are of the order of 1 μm with a maximal sag of 5 μm, and the diameter of each microlens is typically 15 μm in the present example.

Projector 406 further comprises an MOE 426, comprising an optical metasurface 428 disposed on an optical substrate 430. Optical metasurface 428 comprises optical apertures 432*a*, 432*b*, 432*c*, 432*d*, 432*e*, 432*f*, and 432*g*. MOE 426 is shown in a schematic frontal view in an inset 434, with a line G-G corresponding to the plane of FIG. 4A. The diameters of optical apertures 432*a*-432*g* are 1 mm in this example, thus providing sufficient surface area for the impinging beams of optical radiation from VCSELs 416 to avoid high irradiance on MOE 426.

When driven by controller 408, VCSELs 416 of VCSEL arrays 414*a*-414*c* emit respective beams of optical radiation through GaAs die 411, shown schematically by their respective chief rays 436*a*, 436*b*, and 436*c*. The beams, represented by chief rays 436*a*-436*c*, are refracted by microlens array 422 and projected from the small area of GaAs die 411 as diverging beams toward respective optical apertures 432*a*-432*c*. The diverging beams impinge on respective optical apertures 432*a*-432*c*, which collimate, tilt, and split the beams into sub-beams 440*a*, 440*b*, and 440*c* and direct them toward target 404, illuminating the target with spots 402. The collimation of the optical beams is shown by marginal rays 438 emitted by a VCSEL 416*b* at the center of array 414*b*.

Microlens array 422 and MOE 426 are designed so that the beams of optical radiation emitted by VCSELs 416 tile target 404 with a repeating and interleaving pattern of images of sections 412*a*-412*g*.

Alternative Spot and Flood Projector

Figures 5A, 5B, 5C:
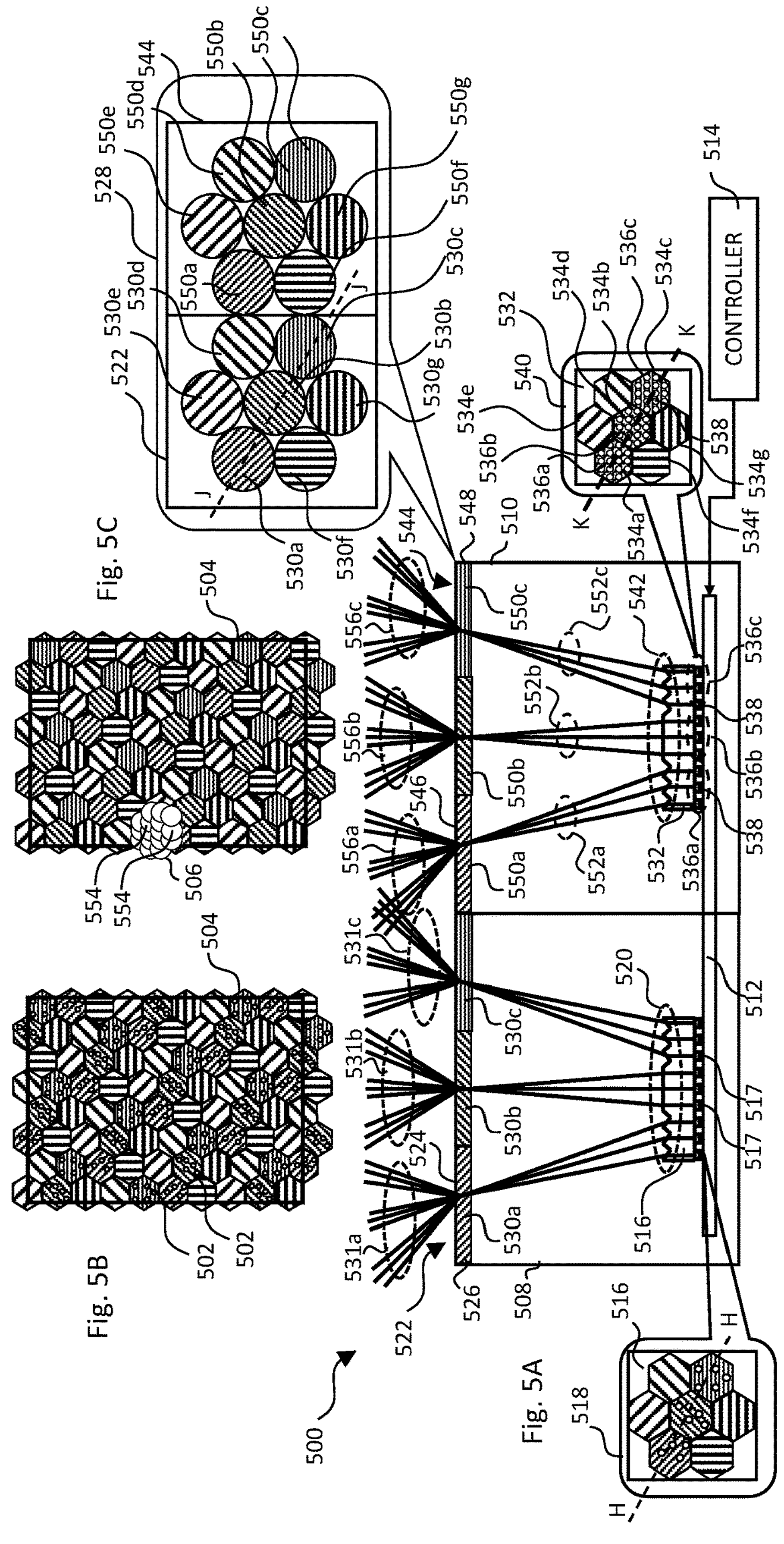
FIG. 5A is a schematic side view of an optoelectronic apparatus, in accordance with an alternative embodiment of the invention.
FIG. 5B is a schematic frontal view of a far-field pattern of spots on a target projected by the apparatus of FIG. 5A, in accordance with an embodiment of the invention.
FIG. 5C is a schematic frontal view of flood illumination on a target projected by the apparatus of FIG. 5A, in accordance with an embodiment of the invention.

FIG. 5A is a schematic side view of an optoelectronic apparatus 500, FIG. 5B is a schematic frontal view of a far-field pattern of spots 502 on a target 504 projected by the apparatus, and FIG. 5C is a schematic frontal view of flood illumination 506 on the target projected by the apparatus, in accordance with an embodiment of the invention.

Apparatus 500 comprises a spot projector 508 and a flood projector 510, sharing a common Si substrate 512, and a controller 514.

Spot projector 508 comprises a GaAs die 516 mounted on Si substrate 512. Die 516 is similar to die 411 (FIG. 4A), comprising seven hexagonal sections, with arrays of VCSELs 517 shown on three of the sections. GaAs die 516 is shown in a schematic frontal view in an inset 518. For the sake of clarity of the figure, the labels of the sections and the VCSEL arrays on die 516 are omitted. A line H-H in inset 518 corresponds to the plane of FIG. 5A. GaAs die 516 also comprises a microlens array 520, similar to microlens array 422 (FIG. 4A). Spot projector 508 furthermore comprises an MOE 522, comprising an optical metasurface 524 disposed on an optical substrate 526. MOE 522, shown (together with an MOE 544, detailed hereinbelow) in a schematic frontal view in an inset 528, comprises optical apertures 530a-530g within optical metasurface 524, similar to optical apertures 432a-432g (FIG. 4A). A line J-J in inset 528 corresponds to the plane of FIG. 5A. Optical apertures 530a-530g are designed to collimate the beams of optical radiation emitted from VCSELs 517 in GaAs die 516 and directed by microlens array 520. When controller 514 drives VCSELs 517 in GaAs die 516, the emitted beams are split, tilted, and collimated into respective sub-beams 531a, 531b, and 531c, which are directed to target 504 similarly to beams 436a-436c in FIG. 4A, and illuminate the target with spots 502.

Flood projector 510 comprises a GaAs die 532 mounted on Si substrate 512. Die 532 comprises seven hexagonal sections 534a, 534b, 534c, 534d, 534e, 534f, and 534g. Sections 534a, 534b, and 534c comprise dense arrays 536a, 536b, and 536c of VCSELs 538. (Dense VCSEL arrays in sections 534d-534g are not shown for the sake of simplicity.) Die 532 is shown in a schematic frontal view in an inset 540, with a line K-K in the frontal view corresponding to the plane of FIG. 5A. Die 532 also comprises an etched microlens array 542, similar to microlens array 520.

Flood projector 510 further comprises MOE 544, comprising an optical metasurface 546 on an optical substrate 548. MOE 544, shown in a schematic frontal view in inset 528, comprises optical apertures 550a-550g within optical metasurface 546. Optical apertures 550a-550g are designed not to collimate the optical beams emitted by VCSELs 538 in GaAs die 532, but rather cause them to diverge. Controller 514 drives VCSELs 538 in arrays 536a-536c, which emit beams of radiation. The beams are refracted by microlens array 542 into diverging beams, represented by chief rays 552a-552c, and directed toward respective optical apertures 550a-550c. Optical apertures 550a-550c split and tilt these beams, and direct them toward target 504 as respective diverging sub-beams 556a, 556b, and 556c, illuminating the target with dense blurred and overlapping spots 554, forming flood illumination 506.

The diameters of optical apertures 550a-550g, as well as those of optical apertures 550a-550c, are typically 1 mm in the present example, thus providing sufficiently large areas for the impinging beams for avoiding damage on the MOEs. Although MOE 522 and MOE 544 are shown as having separate respective optical substrates 526 and 548, they may alternatively be disposed on a common optical substrate.

Figure 6:
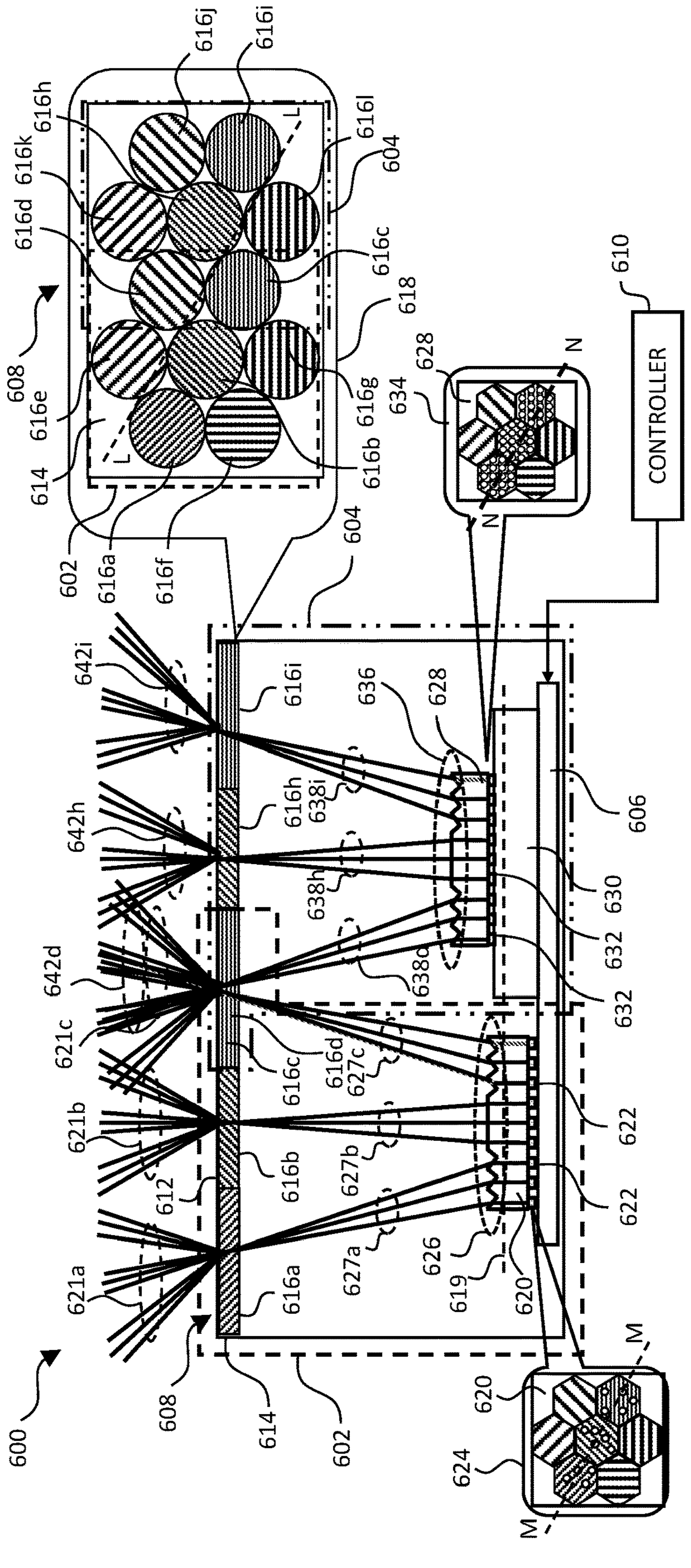
FIG. 6 is a schematic side view of an optoelectronic apparatus, in accordance with an embodiment of the invention.

FIG. 6 is a schematic side view of an optoelectronic apparatus 600, in accordance with an embodiment of the invention. Apparatus 600 comprises a spot projector 602 and a flood projector 604 comprising a common Si substrate 606 and a common MOE 608, and a controller 610.

MOE 608 comprises an optical metasurface 612 disposed on an optical substrate 614, with twelve optical apertures 616a-6161, shown in a schematic frontal view in an inset 618. A line L-L in inset 618 corresponds to the plane of FIG. 6. All twelve optical apertures 616a-6161 of MOE 608 have the same focal length and thus a common focal plane 619. As detailed hereinbelow, both spot and flood illumination are achieved using MOE 608 with its twelve identical optical apertures, rather than using a combination of two different MOEs 522 and 544 (FIG. 5A) with a total of fourteen optical apertures and with different focal lengths for the two MOEs.

Spot projector 602 comprises a GaAs die 620 mounted on Si substrate 606. Die 620 is similar to die 516 (FIG. 5A), comprising seven hexagonal sections comprising arrays of VCSELs 622. GaAs die 620 is shown in a schematic frontal view in an inset 624, with a line M-M corresponding to the plane of FIG. 6. GaAs die 620 also comprises a microlens array 626, similar to microlens array 520 (FIG. 5A).

When controller 610 drives VCSELs 622, the emitted beams are refracted by microlens array 626 into beams represented by chief rays 627a, 627b, and 627c. Microlens array 626 directs these beams toward respective optical apertures 616a, 616b, and 616c. Optical apertures 616a-616c collimate, tilt and split the impinging beams into respective sub-beams 621a, 621b, 621c, similarly to beams 436a-436c in FIG. 4A, direct them toward a target, and illuminate the target with a spot pattern (not shown in this figure).

Flood projector 604 comprises a GaAs die 628 mounted on a pedestal 630, which in turn is mounted on Si substrate 606. (Alternatively, Si substrate 606 and pedestal 630 may be formed by, for example, etching from a single piece of Si.) Die 628 is similar to die 532 (FIG. 5A), comprising seven hexagonal sections, which comprise dense arrays of VCSELs 632. GaAs die 628 is shown in a schematic frontal view in an inset 634, with a line N-N corresponding to the plane of FIG. 6. GaAs die 628 also comprises a microlens array 636, similar to microlens array 520 (FIG. 5A).

When controller 610 drives VCSELs 632, the emitted beams are refracted by microlens array 636 into beams represented by chief rays 638d, 638h, and 638i. Microlens array 636 directs these beams toward respective optical apertures 616d, 616h, and 616i. (Element 616d is behind element 616c in the side view of FIG. 6.) Optical apertures 616d, 616h, and 616i tilt and split the impinging beams into respective sub-beams 642d, 642h, and 642i, but do not collimate them due to the elevation of GaAs die 628 by pedestal 630 to well above focal plane 619. Thus the beams directed toward a target by optical apertures 616d, 616h, and 616i diverge and illuminate the target with defocused (blurred) spots. As, in addition to the blur, the spots originate from dense arrays of VCSELs 632, the target is illuminated by even and broad flood illumination, similar to flood illumination 506 (FIG. 5C).

Spot Projectors with Additional Lenses

Figure 7B:
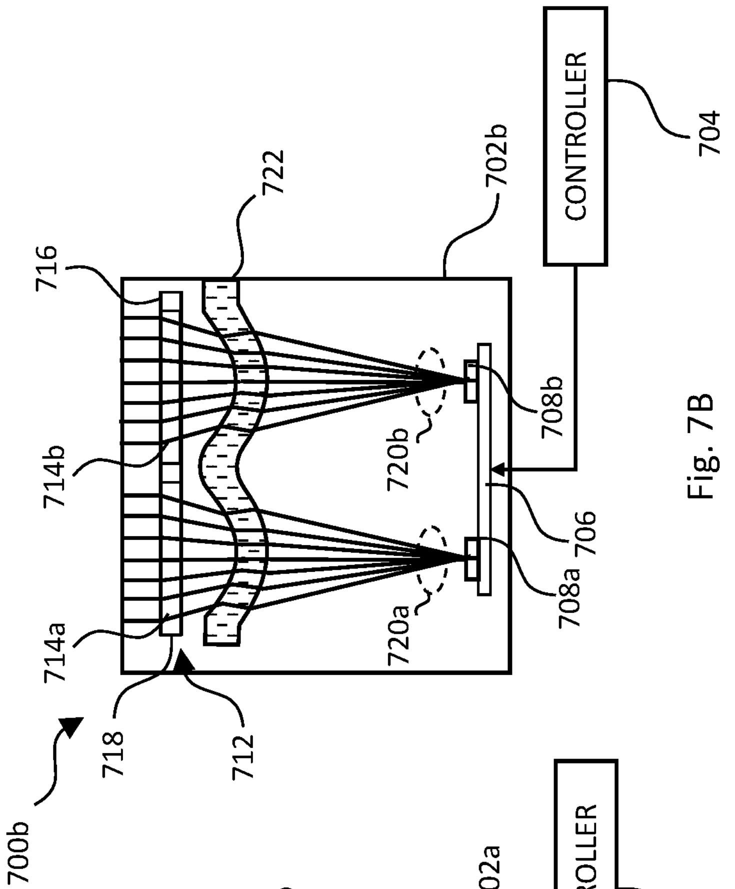
FIGS. 7A and 7B are schematic side views of optoelectronic apparatuses, in accordance with additional embodiments of the invention.
Figure 7A:
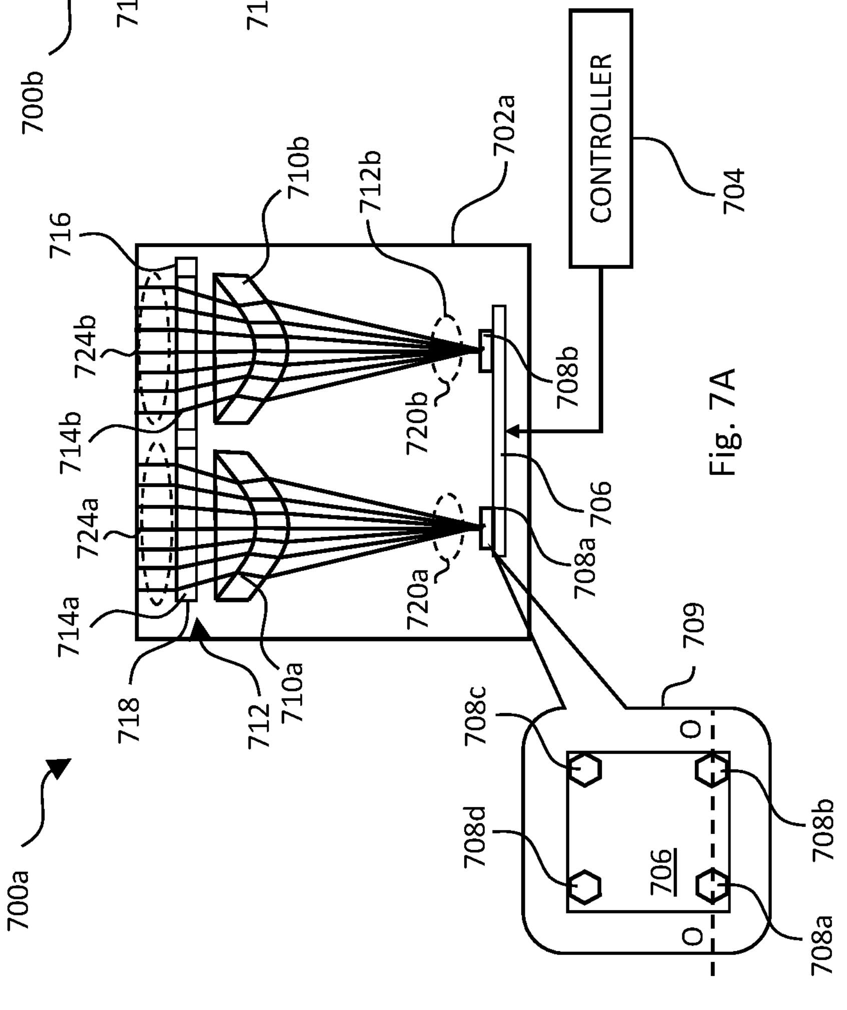

FIGS. 7A and 7B are schematic side views of respective optoelectronic apparatuses 700a and 700b, in accordance with additional embodiments of the invention. Similar or identical items in apparatuses 700a and 700b are indicated by the same labels.

Optoelectronic apparatus 700a comprises a spot projector 702a and a controller 704. Spot projector 702a comprises a Si substrate 706, on which four GaAs dies 708a, 708b, 708c, and 708d are mounted, similarly to GaAs dies 312a-312d (FIG. 3A). A schematic frontal view of Si substrate 706 with GaAs dies 708a-708d is shown in an inset 709, where a line O-O corresponds to the plane of FIG. 7A. Each GaAs die 708a-708d comprises an array of VCSELs (not shown in FIG. 7A for the sake of simplicity). Spot projector 702a further comprises respective optical lenses over dies 708a-708d, of which only lenses 710a and 710b are shown in the figure, and an MOE 712, comprising an optical metasurface 716 disposed on an optical substrate 718. Optical metasurface 716 comprises optical apertures 714a, 714b, . . . . Optical lenses 710a, 710b, . . . , as well as optical apertures 714a, 714b, . . . , are aligned with respective GaAs dies

708*a*-708*d*. (Similarly to apparatus 200 in FIG. 2A, microlenses may be formed on the upper side of the dies so that the apparent source of the beams is located at or close to the top surface of each die.)

Optical lenses 710*a*, 710*b*, . . . may be formed to reduce the optical aberrations of the beams emitted by the VCSELs on GaAs dies 708*a*-708*d*. Alternatively, the optical aberrations may be reduced by an additional MOE, either disposed on the bottom side of MOE 712, or fabricated on a separate substrate, which is either positioned adjacent to MOE 712 or cemented to it.

When controller 704 drives the VCSELs in arrays 708*a*-708*d*, the VCSELs of each array emit respective sets of beams 720*a*, 720*b*, . . . . (Although each array 708*a*-708*d* comprises several VCSELs, the beams from only one VCSEL are shown for the sake of clarity.) Beams 720*a*, 720*b*, . . . , are refracted by respective lenses 710*a*, 710, . . . , and directed onto respective optical apertures 714*a*, 714*b*, . . . . The optical apertures collimate, tilt, and split the beams into respective sub-beams 724*a*, 724*b*, . . . , and direct the sub-beams toward a target, illuminating the target with spot pattern (the target not shown in the figure). Lenses 710*a*, 710*b*, . . . , are designed optically so as to reduce the sizes of the spots projected onto the target, thus increasing the signal-to-noise ratio when detecting the reflections of the spots in, for example, 3D mapping. Additionally, the use of lenses 710*a*, 710*b*, . . . , may relieve the alignment requirements for spot projector 702*a*.

Optoelectronic apparatus 700*b* in FIG. 7B comprises a spot projector 702*b* and controller 704. Spot projector 702*b* is identical to spot projector 702*a* in FIG. 7A, with the exception that the four discrete optical lenses 710*a*, 710*b*, . . . , have been replaced by a monolithic plastic lens 722, which replicates the functions of the discrete lenses. The monolithic design of lens 722 and the choice of plastic material can reduce the fabrication costs and further relieve the alignment requirements for projector 702*b*, as compared to projector 702*a*.

Figure 8:
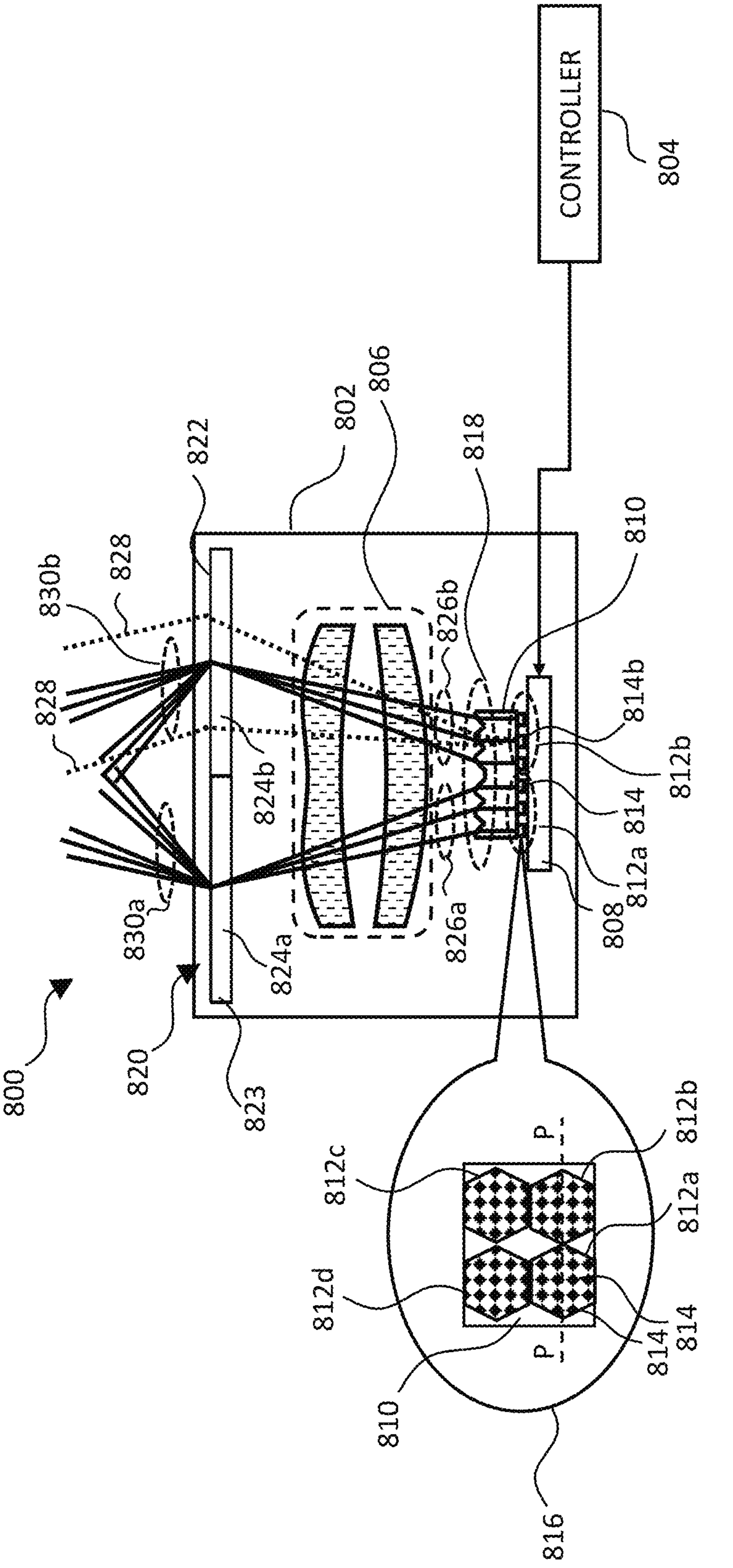
FIG. 8 is a schematic side view of an optoelectronic apparatus, in accordance with a further embodiment of the invention.

FIG. 8 is a schematic side view of an optoelectronic apparatus 800, in accordance with a further embodiment of the invention. Optoelectronic apparatus 800 comprises a spot projector 802 and a controller 804. Spot projector 802 is similar to spot projector 406 of apparatus 400 (FIG. 4A), with an added compound lens 806 for reducing the size of the projected spots on a target. Compound lens 806 may be more costly than the lenses shown in FIGS. 7A and 7B, but it may enable finer collimation of the beams emitted by apparatus 800, as well as reducing the width of apparatus 800 and sensitivity to decentering of the components.

Spot projector 802 comprises a Si substrate 808, comprising drive and control circuits, and a GaAs die 810 mounted on the Si substrate. GaAs die 810 comprises four VCSEL arrays 812*a*, 812*b*, 812*c*, and 812*d*, comprising VCSELs 814. GaAs die 810, together with VCSEL arrays 812*a*-812*d*, is shown in a schematic frontal view in an inset 816, with a line P-P corresponding to the plane of FIG. 8. GaAs die 810 also comprises an etched microlens array 818, similar to microlens array 422 (FIG. 4A). In addition to compound lens 806, the optics of spot projector 802 also comprise an MOE 820, comprising an optical metasurface 822 disposed on an optical substrate 823. Optical metasurface 822 comprises four optical apertures 824*a*, 824*b*, . . . , with respective diameters of 1.6 mm. (In the side view, only VCSEL arrays 812*a* and 812*b* and optical apertures 824*a* and 824*b* are visible.)

Compound lens 806 may be formed to reduce the aberrations of the beams emitted by VCSELs 814 in order to reduce spot sizes on the target, even for large VCSEL-arrays. Alternatively, the optical aberrations may be reduced by an additional MOE, either disposed on the bottom side of MOE 820 or fabricated on a separate substrate, which is either positioned adjacent to MOE 820 or cemented to it.

When VCSELs 814 of VCSEL arrays 812*a*, 812*b*, . . . , are driven by controller 804, they emit beams of optical radiation through GaAs die 810. The beams emitted by arrays 812*a* and 812*b* are refracted by microlens array 818 toward compound lens 806, with the beams denoted schematically by respective chief rays 826*a* and 826*b*. The refracted beams are further refracted by compound lens 806, and impinge on optical apertures 824*a*, 824*b*, . . . , of MOE, which collimate, tilt, and split the beams into respective sub-beams 830*a*, 830*b*, . . . , and direct them toward a target, illuminating the target with a spot pattern (not shown in this figure). The collimation of the beams is shown by marginal rays 828 emitted by a central VCSEL 814*b* in array 812*b*.

Alternative Flood Projector

Figure 9:
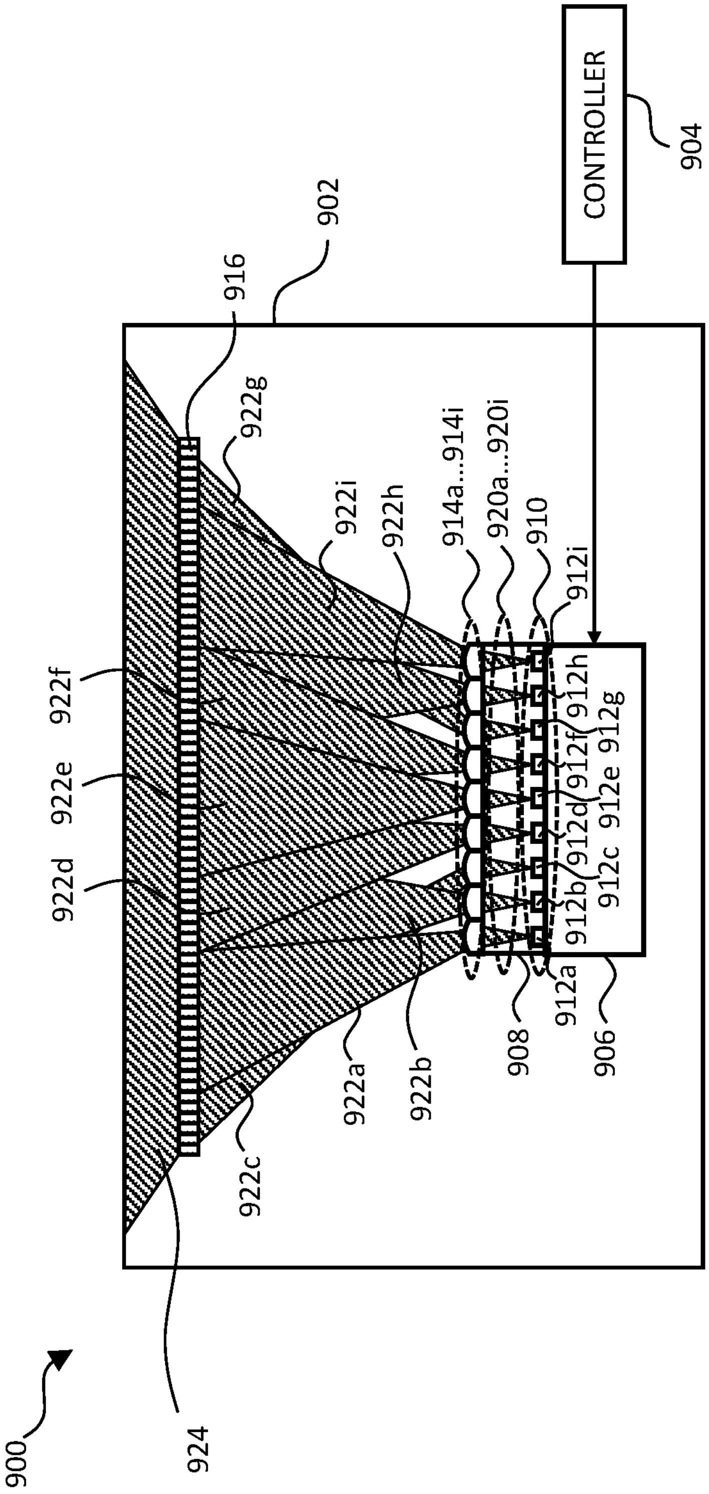
FIG. 9 is a schematic side view of an optoelectronic apparatus, in accordance with yet another embodiment of the invention.

FIG. 9 is a schematic side view of an optoelectronic apparatus 900, in accordance with yet another embodiment of the invention. Optoelectronic apparatus 900 comprises a flood projector 902 and a controller 904.

Flood projector 902 comprises a Si substrate 906, comprising drive and control circuits, and a GaAs die 908 mounted on the Si substrate. GaAs die 908 comprises a VCSEL array 910, comprising VCSELs 912*a*-912*i*. (Although only a single row of VCSELs is shown in this side view, die 908 may comprise a two-dimensional array of VCSELs as in the preceding embodiments.) VCSELs 912*a*-912*i* are formed on the back side of GaAs die 908, while microlenses, referred to as on-chip lenses (OCLs) 914*a*-914*i*, are formed on the front side. Each OCL is aligned with a respective VCSEL (for example, 914*a* to 912*a*), but offset laterally as will be detailed hereinbelow. Alternative embodiments may comprise VCSEL arrays with a higher or lower number of VCSELs, as well as either one-dimensional or two-dimensional arrays.

Flood projector 902 further comprises an MOE 916, which spreads and homogenizes the spatial and angular profile of light output by the projector.

When VCSELs 912*a*-912*i* are driven by controller 904, they emit respective beams of optical radiation 920*a*-920*i* through GaAs die 908. Beams 920*a*-920*i* impinge on respective OCLs 914*a*-914*i*, which refract them to beams 922*a*-922*i*. Each of OCLs 914*a*-914*i* is decentered within the hexagonal aperture of respective VCSEL 912*a*-912*i* so that it steers the respective one of beams 922*a*-922*i* in a desired direction, causing the chief rays of some of the beams to cross with those of other beams. For improved compatibility with the manufacturing process, OCLs 914*a*-914*i* are paired so that each left-steered beam has as its counterpart a symmetrically positioned right-steered beam. Additionally or alternatively, the OCLs may have different, non-symmetrical sag profiles, resulting in different beam tilt angles. Further additionally or alternatively, the OCLs in flood projector may be toroidal, as in the embodiments described above, with appropriate tilt to cause the beams to cross as appropriate for the present embodiment.

In the pictured example, OCL 914*c* is offset so that beam 922*c* crosses beams 922*a* and 922*b*. The optical powers (focal lengths) of OCLs 914*a*-914*i* are chosen so as to reduce the numerical aperture (NA) of each of beams 922*a*-922*i* relative to the NA of beams 920*a*-920*i*. The NA of beams 920*a*-920*i* is typically 0.16-0.25, for example, while that of beams 922*a*-922*i* is lower, for example around 0.1. Due to the difference between the refractive indices of GaAs and air (3.5 vs. 1), however, the angular divergence of beams 922*a*-922*i* is larger than that of beams 920*a*-920*i*. Beams 922*a*-922*i* impinge on MOE 916, which diffracts the beams into multiple spread-out diffracted orders 924 that propagate toward a target (not shown in the figure).

The mutual crossing of beams 922*a*-922*i*, together with their divergence, spreads them uniformly across MOE 916, thus reducing the thermal load on the MOE and on any subsequent layers above the MOE. Furthermore, crossing of the beams reduces inhomogeneities in the flood illumination that might otherwise occur due to temperature differences among VCSELs 912*a*-912*i*, because the VCSELs at the center of the array tend to become substantially hotter than those in the periphery. MOE 916 is designed to diffract beams 922*a*-922*i* into a large number of overlapping diffracted orders in two dimensions, such as 100×100 orders, thus increasing the beam overlap on the target and providing highly diffuse flood illumination on the target with reduced tiling artifacts.

In an alternative embodiment, a random component may be added to the offsets and/or sag profiles of OCLs 914*a*-914*i* with respect to VCSELs 912*a*-912*i* in order to randomize the directions into which the OCLs steer beams 922*a*-922*i*. This kind of randomization increases the resilience of the system with respect to thermal power gradients. The offsets and/or sag profiles may further be utilized to adjust the overall shape of diffracted orders 924 exiting from flood projector 902 in order to accommodate functional and aesthetic considerations. The partial collimation (non-zero divergence) of beams 922*a*-922*i* reduces the size of MOE 916 required to accommodate these beams, while taking into account the tolerances of the NAs of the emitted beams 920*a*-920*i*.

Controller 904 typically drives VCSELs 912*a*-912*i* with pulses; for example, driving the VCSELs with 22 pulses of a duration of 33 μs per pulse, with an interval between the pulses of 205 μs, leads to a total flood illumination time (and hence to a total acquisition time of a target image) of 5.05 ms. In alternative embodiments, controller 904 may drive VCSELs 912*a*-912*i* with pulses of different durations and intervals, or alternatively with a drive current that is constant in time (DC current).

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. An optoelectronic apparatus, comprising:

a semiconductor substrate;

an array of emitters disposed on the semiconductor substrate and configured to emit beams of optical radiation having respective chief rays;

an optical diffuser mounted over the semiconductor substrate and configured to diffuse the beams, wherein the diffuser comprises an optical substrate and an optical metasurface disposed on the optical substrate; and microlenses disposed between the semiconductor substrate and the optical diffuser in respective alignment with the emitters and configured to steer the beams at different, respective angles, which are selected so that at least some of the chief rays cross one another before passing through the diffuser.

2. The apparatus according to claim 1, wherein the optical metasurface is configured to split the beams into respective groups of diverging sub-beams, and to direct the sub-beams to illuminate a target with flood illumination.

3. The apparatus according to claim 1, wherein the microlenses are configured to randomize the angles at which the beams are steered.

4. The apparatus according to claim 1, and comprising a controller, which is configured to actuate the apparatus so as to illuminate a target with flood illumination.

5. An optoelectronic apparatus, comprising:

a semiconductor substrate;

an array of emitters disposed on the semiconductor substrate and configured to emit beams of optical radiation having respective chief rays;

an optical diffuser mounted over the semiconductor substrate and configured to diffuse the beams;

microlenses disposed between the semiconductor substrate and the optical diffuser in respective alignment with the emitters and configured to steer the beams at different, respective angles, which are selected so that at least some of the chief rays cross one another before passing through the diffuser; and a semiconductor die mounted on the semiconductor substrate, wherein the emitters are disposed on a back side of the semiconductor die and the microlenses are formed on a front side of the semiconductor die.

6. The apparatus according to claim 5, wherein the microlenses comprise a monolithic part of the semiconductor die.

7. An optoelectronic apparatus, comprising:

a semiconductor substrate;

an array of emitters disposed on the semiconductor substrate and configured to emit beams of optical radiation having respective chief rays;

an optical diffuser mounted over the semiconductor substrate and configured to diffuse the beams; and microlenses disposed between the semiconductor substrate and the optical diffuser in respective alignment with the emitters and configured to steer the beams at different, respective angles, which are selected so that at least some of the chief rays cross one another before passing through the diffuser, wherein the microlenses are laterally offset relative to the emitters with an offset that varies among the microlenses so as to steer the beams at the different, respective angles.

8. An optoelectronic apparatus, comprising:

a semiconductor substrate;

an array of emitters disposed on the semiconductor substrate and configured to emit beams of optical radiation having respective chief rays;

an optical diffuser mounted over the semiconductor substrate and configured to diffuse the beams; and microlenses disposed between the semiconductor substrate and the optical diffuser in respective alignment with the emitters and configured to steer the beams at different, respective angles, which are selected so that at least some of the chief rays cross one another before passing through the diffuser, wherein the microlenses have different, respective sag angles, which are selected so as to steer the beams at the different, respective angles.

9. An optoelectronic apparatus, comprising:

a semiconductor substrate;

an array of emitters disposed on the semiconductor substrate and configured to emit beams of optical radiation having respective chief rays;

an optical diffuser mounted over the semiconductor substrate and configured to diffuse the beams; and microlenses disposed between the semiconductor substrate and the optical diffuser in respective alignment with the emitters and configured to steer the beams at different, respective angles, which are selected so that at least some of the chief rays cross one another before passing through the diffuser, wherein each microlens comprises a tilted toroidal surface having a tilt selected so as to steer the beams at the different, respective angles.

10. An optoelectronic apparatus, comprising:

a semiconductor substrate;

an array of emitters disposed on the semiconductor substrate and configured to emit beams of optical radiation having respective chief rays;

an optical diffuser mounted over the semiconductor substrate and configured to diffuse the beams; and microlenses disposed between the semiconductor substrate and the optical diffuser in respective alignment with the emitters and configured to steer the beams at different, respective angles, which are selected so that at least some of the chief rays cross one another before passing through the diffuser, wherein the microlenses are configured to increase a divergence of the beams emitted by the emitters.

11. A method for optical projection, comprising:

mounting on a semiconductor substrate an array of emitters configured to emit beams of optical radiation having respective chief rays;

mounting an optical diffuser over the semiconductor substrate so as to diffuse the beams, wherein the diffuser comprises an optical substrate and an optical metasurface disposed on the optical substrate; and aligning microlenses between the semiconductor substrate and the optical diffuser with the emitters so as to steer the beams at different, respective angles, which are selected so that at least some of the chief rays cross one another before passing through the diffuser.

12. The method according to claim 11, wherein the optical metasurface is configured to split the beams into respective groups of diverging sub-beams, and to direct the sub-beams to illuminate a target with flood illumination.

13. The method according to claim 11, wherein mounting the array of emitters comprises mounting a semiconductor die on the semiconductor substrate, wherein the emitters are disposed on a back side of the semiconductor die and the microlenses are formed on a front side of the semiconductor die.

14. The method according to claim 11, wherein aligning the microlenses comprises laterally offsetting the microlenses relative to the emitters with an offset that varies among the microlenses so as to steer the beams at the different, respective angles.

15. The method according to claim 11, wherein aligning the microlenses comprises forming the microlenses with different, respective sag angles, which are selected so as to steer the beams at the different, respective angles.

16. The method according to claim 11, wherein each microlens comprises a tilted toroidal surface having a tilt selected so as to steer the beams at the different, respective angles.

17. The method according to claim 11, wherein the microlenses are configured to increase a divergence of the beams emitted by the emitters.

18. The method according to claim 11, and comprising actuating the emitters so as to illuminate a target with flood illumination.

* * * * *